United States Patent
Rohrer

(10) Patent No.: US 10,094,356 B2
(45) Date of Patent: Oct. 9, 2018

(54) MULTI MODE WAVE ENERGY CONVERTER WITH ELONGATED WAVE FRONT PARALLEL FLOAT HAVING INTEGRAL LOWER SHOALING EXTENSION

(71) Applicant: Rohrer Technologies, Inc., York, ME (US)

(72) Inventor: John W. Rohrer, York, ME (US)

(73) Assignee: Rohrer Technologies, Inc., York, ME (US)

( * ) Notice: Subject to any disclaimer, the term of this patent is extended or adjusted under 35 U.S.C. 154(b) by 158 days.

(21) Appl. No.: 15/286,539

(22) Filed: Oct. 5, 2016

(65) Prior Publication Data

US 2017/0022964 A1 Jan. 26, 2017

Related U.S. Application Data

(63) Continuation-in-part of application No. 14/530,723, filed on Nov. 1, 2014, now Pat. No. 9,863,395, which (Continued)

(51) Int. Cl.
*F03B 13/18* (2006.01)
*H02K 7/18* (2006.01)

(52) U.S. Cl.
CPC ........ *F03B 13/1815* (2013.01); *F03B 13/182* (2013.01); *F03B 13/186* (2013.01); *H02K 7/18* (2013.01); *F05B 2270/18* (2013.01); *Y02E 10/38* (2013.01)

(58) Field of Classification Search
CPC ........ F01D 15/10; F01D 15/20; F01B 13/264; F03B 15/00; F03B 13/18; F03B 13/14
See application file for complete search history.

(56) References Cited

U.S. PATENT DOCUMENTS

| | | | |
|---|---|---|---|
| 4,295,800 A * | 10/1981 | Packer | F03B 13/1815 417/333 |
| 7,878,734 B2 * | 2/2011 | Bull | B63B 35/4406 290/42 |

(Continued)

*Primary Examiner* — Mark Laurenzi
*Assistant Examiner* — Shafiq Mian
(74) *Attorney, Agent, or Firm* — Lorusso & Associates

(57) ABSTRACT

A wave barrier or wave terminator type ocean wave energy converter (WEC) utilizing one or multiple adjacent floats together forming an elongated wave front parallel (EWFP) float rotatably connected by at least one swing or drive arm to a secondary floating or shore or seabed fixed body or frame, such that the at least one swing arm is rotating about a submerged pivot point or axle on such body or frame and constraining the motion of the float(s) relative to the body or frame when wave forces are applied against the float(s). Relative to the direction of oncoming wave fronts and relative to the still water line (SWL), the at least one EWFP float is substantially forward of, and above, the pivot point such that the float concurrently moves both upward and rearward on wave crests and returns both forward and downward on ensuing wave troughs. The rear surface of the EWFP float is substantially arcuate and concave with a radius approximating its distance from the pivot point such that the float produces minimal energy consuming back waves when it is being moved by oncoming wave forces. The lower rear arcuate surface of the float can extend below the bottom of the float deeper into the water column to capture additional wave energy.

18 Claims, 9 Drawing Sheets

Related U.S. Application Data is a continuation-in-part of application No. 14/101,325, filed on Dec. 9, 2013, now Pat. No. 9,127,640, which is a continuation-in-part of application No. 13/506,680, filed on May 8, 2012, now Pat. No. 8,614,520.

(60) Provisional application No. 62/284,640, filed on Oct. 5, 2015.

(56) References Cited

U.S. PATENT DOCUMENTS

| | | | | |
|---|---|---|---|---|
| 8,264,095 B2 * | | 9/2012 | Camp | F03B 13/181 290/42 |
| 8,614,520 B2 * | | 12/2013 | Rohrer | F03B 13/182 290/42 |
| 9,127,640 B2 * | | 9/2015 | Rohrer | F03B 13/182 |
| 2002/0067043 A1 * | | 6/2002 | Ovadia | F03B 13/1815 290/53 |
| 2008/0093852 A1 * | | 4/2008 | Vowles | F03B 13/14 290/42 |
| 2010/0213710 A1 * | | 8/2010 | Rhinefrank | F03B 13/20 290/42 |
| 2012/0032446 A1 * | | 2/2012 | Rohrer | F03B 13/1815 290/53 |
| 2013/0081388 A1 * | | 4/2013 | Straume | B63B 22/20 60/496 |
| 2014/0338321 A1 * | | 11/2014 | You | F03B 13/189 60/496 |
| 2015/0082785 A1 * | | 3/2015 | Rohrer | F03B 13/182 60/500 |

* cited by examiner

Salter — Edinburgh "Duck" (Related Art)

Columbia Power StingRAY (Related Art)

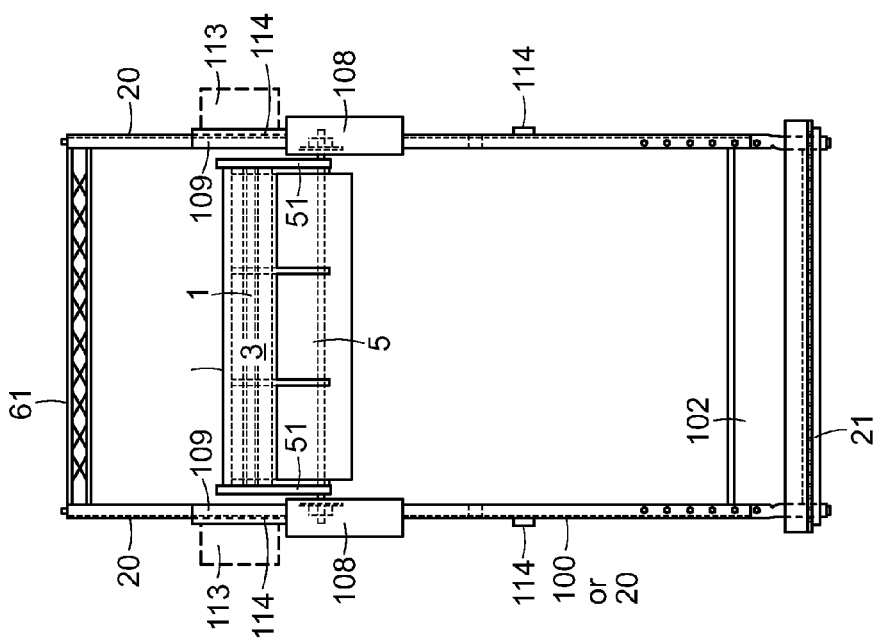
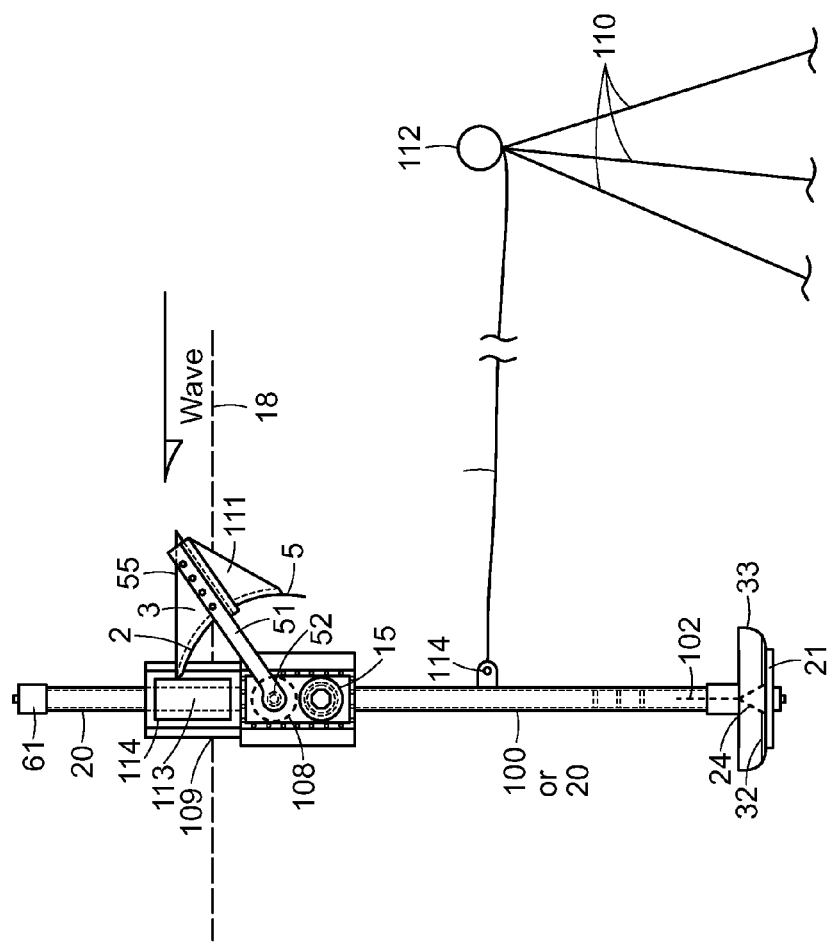
FIG. 6B
FIG. 6A

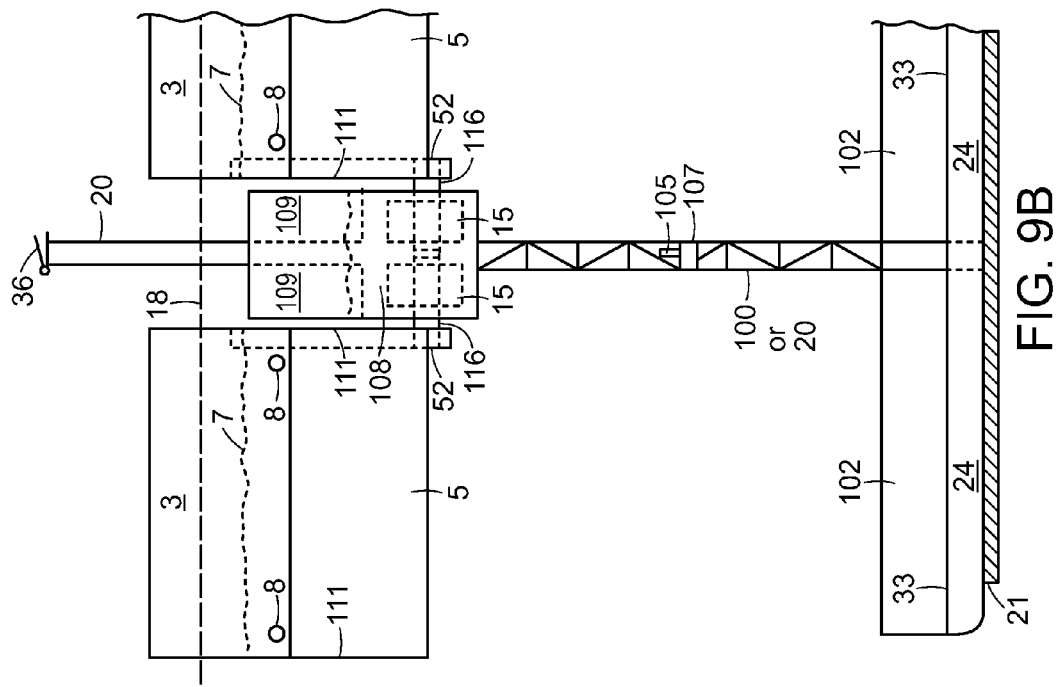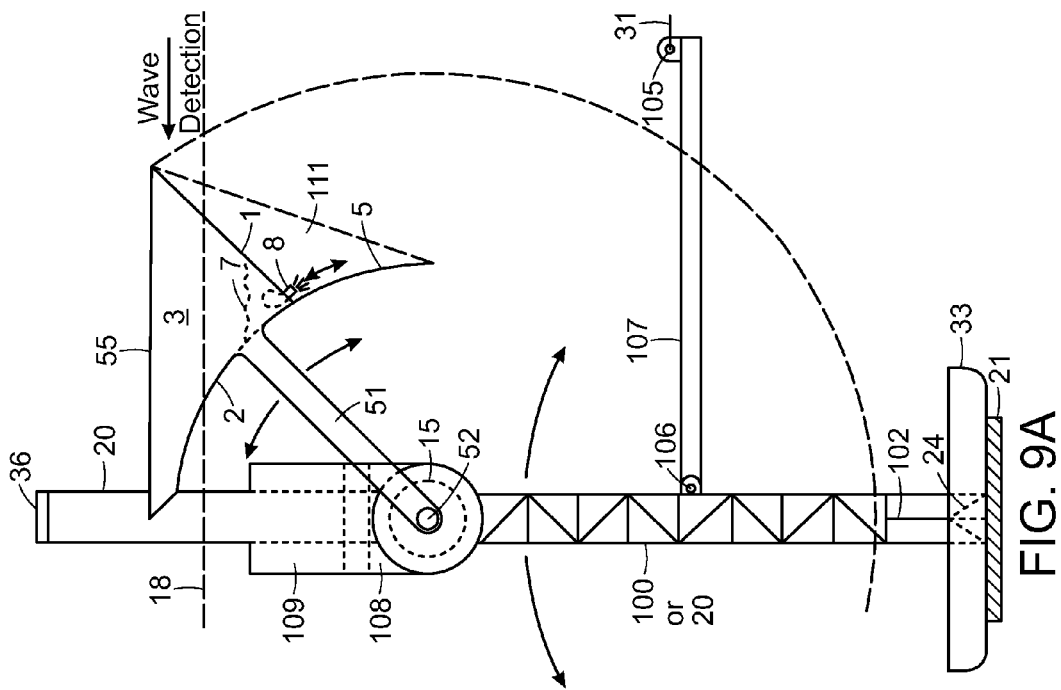

MULTI MODE WAVE ENERGY CONVERTER WITH ELONGATED WAVE FRONT PARALLEL FLOAT HAVING INTEGRAL LOWER SHOALING EXTENSION

CROSS-REFERENCE TO RELATED APPLICATIONS

This is a Continuation-In Part of U.S. Regular Utility application Ser. No. 14/530,723, filed Nov. 1, 2014, which is a Continuation-in-Part of U.S. Regular Utility application Ser. No. 14/101,325, filed Dec. 9, 2013, now U.S. Pat. No. 9,127,640, issued Sep. 8, 2015, which is a Continuation-In-Part of U.S. Regular Utility application Ser. No. 13/506,680, filed May 8, 2012, now U.S. Pat. No. 8,614,520, issued Dec. 24, 2013, and claims the benefit of U.S. Provisional Application Ser. No. 62/284,640 filed Oct. 5, 2015, the contents all of which are incorporated in their entirety herein by reference.

FIELD OF THE DISCLOSURE

This disclosure relates to the production of electrical power, pressurized water, or other useful work from surface waves on a water body. More particularly, this disclosure relates to Wave Energy Converters ("WEC") of the wave terminator or barrier type, wherein one or more elongated buoyant surface floats or bodies, or groups of adjacent floats or bodies are oriented, or self-orienting, parallel to the prevailing direction of oncoming wave fronts or swells.

The disclosure relates primarily to WECs having one or more floats or bodies linked or connected by one or more swing arms or other mechanical linkages to one or more stationary or stabilized bodies, frames, or seabed or shore attachment points. Such linkages drive a power take off (PTO) and are arranged in such a manner that the buoyant floats or bodies can rotate and/or translate about the attachment points, or concurrently move in more than one axis or direction of motion to thereby allow the WEC to absorb and capture additional heave (vertical), surge (lateral) and or pitch (rotational) wave energy from such multi-axis or multi-direction motion.

To avoid potentially damaging broadside impacts from extreme waves during severe sea conditions, or to optimize performance, the elongated and wave front parallel floats or bodies of several embodiments of the disclosure can be partially or fully submerged during severe sea conditions. Such float submergence, and re-emergence, can be facilitated by any of several means including forcing float submergence by utilizing the WEC's PTOs (in reverse), by use of auxiliary drives to force float submergence, by partially or fully flooding the float, or by altering the submerged depth of the stabilized bodies or frames or their attachment points to force submergence of the floats under the still water line, or under oncoming wave troughs, until severe seas subside.

BACKGROUND OF THE DISCLOSURE

Ocean wave energy, especially in more northern and southern latitudes of the globe, is several times more concentrated than the wind energy which produces ocean waves, wind energy itself being several times more concentrated than the solar energy which produces wind. Wave energy, a huge global resource, is also more consistent and predictable than solar or wind energy. Wave energy, therefore, has the potential to become less costly than solar or wind. The wave energy industry, however, remains in a nascent state, well behind solar and wind in spite of (or perhaps in part because of) a profusion of hundreds of proposed unique distinct wave energy converter (WEC) designs, and because no one has yet demonstrated a WEC design which is generally recognized as ocean survivable with a levelized cost of power competitive with solar and wind.

Most proposed WEC designs attempt to absorb wave energy from above with horizontal plane surface area dependent WECs including spar buoys, articulating rafts, and oscillating water columns (OWCs). Because typical ocean waves and swells average 100-300 meters in wave length, such horizontal plane surface area dependent WECs must at least span wave crests (¼ of total wave length) requiring WECs with huge surface area making them unaffordable. Compounding this high surface area WEC cost problem, most surface area dependent WECs capture only "heave" (the vertical or potential wave energy component) and little or no "surge" (lateral or kinetic energy component), each being exactly ½ of total wave energy in deep water (depths above ½ wave length). Wave energy is much more concentrated as it passes through a vertical plane at or near the water surface and parallel to oncoming wave fronts. Wave energy decreases exponentially with water depth.

The present disclosure is of the wave "barrier" or "terminator" type WEC utilizing at least one "Elongated Wave Front Parallel" (EWFP) surface float. Other terminator type WECs include the "Salter Duck" (Stephen Salter, U. of Edinburgh, GB1482085, 1977), Akers Engineering barge with float (Ersdal, WO 2011071390), Columbia StingRay (Rhinefrank US 2015/0252777), Azura (Gardiner US2010/01409440), WEPTOS (Larsen WO2015082638), and the related John Rohrer/Rohrer Technologies, Inc. patents and applications (referenced above in the Cross-reference to Related Applications section).

The Salter "Duck" (FIG. 1) uses multiple adjacent very large diameter EWFP floats of circular section with a large buoyant cam lobe shaped protrusion extending from one quadrant and facing towards prevailing oncoming wave fronts. The float lobe rotates or "nods" up and down (like a "duck") up to about +/−45° about a large diameter relatively motion stabilized cylindrical core or "flexible spine" in response to wave heave and surge forces driving a hydraulic power take-off (PTO) system located within the core. Projected wave energy capture efficiencies (in realistic random seas) are promising (up to 65%) with large float diameter ducks (18 meters) projected to capture 1.5 to 3.0 times more wave energy than smaller diameter (6 meter) Ducks but even at 6 meter float diameter capital costs/MW appear uncompetitive with other renewables (Nature Vol. 263, No. 5574, pp. 2230226, Sep. 16, 1976).

The WEPTOS WEC consists of multiple adjacent Salter Duck shaped floats mounted concentrically about either of 2 line shafts (drive shafts) arranged in a "V" configuration with the apex pointed up-sea toward oncoming wave fronts. Wave forces successively lift the buoyant cam shaped lobes of each Duck shaped float rotating each line shaft (which is connected to a generator or other PTO) in only one direction. The floats gravity return into subsequent wave troughs without power capture using a ratcheting or one way clutch connection to the line shaft.

The Aker WEC consists of an up-sea EWFP float attached below the Still Water Line (SWL) to a down-sea stabilizing barge with 2 swing or PTO drive arms. The barge is several times the volume, mass, and cost of the EWFP float resulting in high capital cost (CAPEX).

The Columbia StingRay (FIG. 2 and 2015/0252777), like the Salter Duck, also utilizes a large central cylinder (8 meter diameter) housing its 2 direct drive rotary electric PTO(s), with a fore float similar in shape to the Duck cam lobe shaped float. Unlike the Duck, however, only the float rotates rather than the entire cylinder (on 2 swing arms about pivot points on the central cylinder horizontal axis). The forward oriented cam shaped lobe or float of the StingRay rotates about a stationary central cylinder rather than being affixed to a rotating central cylinder. The cylinder is rigidly mounted to a vertically oriented twin spar column frame reaching deep into the water column and connected to each other near the bottom by a horizontal plane drag plate to reduce cylinder heave (vertical) motion, the two frame vertical columns being connected to a submerged mooring buoy allowing the WEC to weather vane parallel to oncoming wave fronts, both frame and mooring as previously described in Rohrer U.S. Pat. No. 8,604,631 and its continuations.

The StingRay also utilizes a rear EWFP float on swing arms (like McCabe U.S. Pat. No. 5,132,550) which is partially masked from wave energy by the large central cylinder in front of it. During severe seas, the fore float is either rotated behind the cylinder using it as a protective barrier or flooded and submerged as previously described and claimed in Rohrer U.S. Pat. No. 8,614,520 and its continuations.

The Azura (formerly WET-NZ) WEC (US 2010/0140944) utilizes a narrow (point absorber type) horizontally oriented float, hinged near the water surface to a vertically oriented "elongate reactive body". It differs from Salter's Duck, WEPOS, the Stingray. Akers, and the present disclosure by arranging the float to trail rather than precede the reactive body (buoyant cylinder, barge or frame). The wave surge forces acting against both the upper portions of the reactive body and the float produce both lateral movement and rotation of the body enhancing the relative motion between float and body (frame). Such lateral and rotational movement of any such vertically oriented elongated reactive body connected to a surface float is impossible to prevent. The Stingray (Rhinefrank 2015/025277, however, does claim lateral and rotation movement of their buoyant cylinder and twin spar frame which is predated by Azura. McCabe. and others.

The RTI F2 QD of the present disclosure utilizes swing arms to rotatably attach the at least one EWFP float to its twin spar heave stabilized (but not pitch stabilized) frame driving a single or dual PTOs housed within the frame, thus avoiding the costly central cylinder of the Duck and Stingray. Preferred embodiments of the present and the referenced John Rohrer Related U.S. Patents and Application Data describe and claim submergence of the EWFP float(s) below the troughs of storm waves, by seawater flooding or other means, for secure WEC survival in severe sea conditions.

SUMMARY OF THE DISCLOSURE

The disclosure utilizes a EWFP float, or multiple adjacent floats together comprising an EWFP float, with at least one rigidly or pivotably connected swing or drive arm which arm is rotatably connected to a either a fixed structure or a buoyant frame or "reaction mass" at a submerged pivot point, which arm rotation drives a power take-off or PTO within or attached to such structure or frame. The at least one swing arm pivot point is located both aft of the float, relative to the direction of oncoming or prevailing wave fronts, and below the SWL on either a shoreline or seabed affixed structure or a float, barge, raft or buoyant frame moored to the seabed. At least a majority of the rearward surface of the EWFP float faces toward and is relatively concentric about the at least one pivot point and is substantially concave and arcuate with a radius of curvature approximating the distance between the rearward EWFP float surface and the at least one swing arm pivot point or axis. The arcuate rearward surface of the EWFP float surface, including any lower or upper arcuate extensions of the arcuate surface, which lower extensions we shall refer to as a "shoaling lip" or "shoaling extension", scribes and arc angle of at least about 30° and not more than about 180° about the swing arm pivot point. This arcuate rearward surface of the float back of the present disclosure, like the Duck's large central cylinder, produces minimal back wave as the float is rotated back and forth by wave heave and surge forces.

A primary wave energy capture efficiency advantage of the Salter Duck (and the WEPTOs and StingRay WECs which utilize the Duck float geometry) is the minimal energy consuming "back wave" produced when the protruding forward facing buoyant Duck float lobes rotate upward and rearward in response to oncoming combined wave heave and surge forces and subsequently rotate forward and downward on subsequent wave troughs. The upward and rearward Duck float lobe movement allows concurrent capture of both wave heave and wave surge energy. Most WECs capture a portion of either wave heave or wave surge energy but not both.

A third efficiency advantage of large diameter Duck like WEC floats is the additional energy capture obtained from deeper into the water column as a portion of each wave's lateral surge motion, and its associated kinetic energy, is deflected upward by the large diameter Duck float central cylinder toward the buoyant protruding float lobe or float, the lower cylinder functioning much like a shoaling plane. Unfortunately, Salter's scaled wave tank experiments found that good wave energy capture efficiency required very large Duck float central cylinder diameters (see prior reference to 1977 Nature article above). They require a wide (to intercept more wave front) large diameter (6-18 meter) water tight air filled central cylinders (housing their PTO equipment) resulting in high capital cost (CAPEX).

If the Duck, StingRay, or WEPTOS central cylinder diameters are made smaller, to save CAPEX, then efficiency is reduced via two additional mechanisms. Firstly, a major portion of each oncoming wave's kinetic or surge forces impact the cylinder below its equator deflecting kinetic energy downward rather than upward to lift the lobe or float. Secondly, wave energy experiments done by Salter and Lin in the late 90's on the "Sloped IPS Buoy" (www.homepages.ed.ac.uk/shs/Wave %20Energy/slopedips3b.pdf) showed that floats constrained to a constant sloped angle motion (they used a 45° inclined low friction track) capture substantially more combined heave and surge wave energy than vertical tracks (which capture primarily the vertical or heave wave energy component) or horizontal tracks (which capture primarily the lateral or surge wave energy component).

If the costly central cylinder diameter is less than twice the wave height, than the Salter/StingRay/WEPTOS lobe or float will capture little or no lateral/surge wave motion when the lobe float is near horizontal (relative to its pivot point in the center of the central cylinder). Likewise, when the Salter/StingRay/WEPTOS lobe or float is near vertical, it captures little or no heave/vertical wave energy. Keeping near the ideal 45° slope for most of the float or lobe travel requires large costly central cylinders.

If one designs a Duck like WEC for an average 4 meter high full output design wave, the WECs will require a costly 8 meter central cylinder diameter just to limit float travel to 90° (full horizontal to full vertical and back). At 90°, float or buoyant lobe orientation (horizontal) no surge wave energy is being captured and at 0° (vertical), no heave wave energy will be captured.

Lateral (surge) forces acting directly against Duck like large diameter partially submerged buoyant central cylinders on the ocean surface and their buoyant lobes or floats pitch the cylinder rearward reducing the travel arc of the lobe or float rotating about it. This rearward central cylinder movement creates a "back wave" further reducing capture efficiency.

The large partially submerged buoyant central cylinders of Duck like WECs have a large water plane area exceeding that of their floats or buoyant lobes. This high central cylinder water plane area produces vertical bobbing of the cylinder on wave crests and troughs further reducing the relative vertical movement between cylinder and float or lobe thus further reducing energy capture.

The present disclosure eliminates the costly central cylinders Duck like WECs while actually enhancing their good energy capture performance with several additional performance advantages. The large Duck like WEC central cylinders are replaced by a small arcuate section (typically 45° to 90°) of the back of the float in the present disclosure including any arcuate lower extension or shoaling lip attached to or integral with the bottom of such float. This reduces Duck like float plus central cylinder surface area, volume, mass, and hence CAPEX at least 4 to 8 fold. This 45° to 90° arcuate float back of the present disclosure replaces the only energy capturing portion of the 360° Duck like WEC's central cylinder while preserving its advantageous "no back wave" and sloped lobe or float path of motion benefits. The energy capture efficiency gains of increased cylinder diameter in Duck like WECs previously referenced can be fully realized with the present disclosure simply by increasing swing arm length (and changing the radius of curvature of the Float back) rather than increasing the diameter, mass and cost of the Duck's large central cylinder.

Costs are further reduced vs Duck like WECs due to the elimination of the central cylinder ends, internals, and structural shell which must be designed to endure the broadside impacts of occasional huge 15 meter high storm waves. Preferred embodiments of the present disclosure, like cited related prior U. S. Application Data, including US 2015/0082785 and U.S. Pat. No. 9,127,640, incorporated herein by reference, describe and claim seawater flooding of the EWFP float of the present disclosure during severe sea states allowing the float to be lowered on its swing arms to the 6 o'clock downward position, well below the wave troughs of even 15 meter high storm waves. Power generation is restored by elevating the float above the SWL allowing float flooding seawater to free drain out prior to resumption of power production.

The present disclosure also provides advantages over Duck like and other WECs with respect to Power Take-Off (PTO) selection and use. The Salter Duck describes use of a hydraulic PTO housed within the large central cylinder which drives multiple generators using rotary hydraulic motors. The StingRay has its fore and aft floats mounted to separate pairs of swing or drive arms allowing direct use of 2 separate direct drive generators (one for each float) which generators reverse their rotational direction twice during each typical 6-16 second wave cycle. These are also housed within its large central cylinder.

The present disclosure, with its one or more adjacent floats each mounted on one or two rotating swing arms, can direct drive either one or two geared or ungeared rotary electric generators (one for lower CAPEX or two for redundant reliability) housed in one or both vertical spar frame members. Power conditioning for utility line interconnection compatibility can be done electronically either on-board or at a remote collection point. Alternatively, if the drive shafts to each generator are each fitted with a one-way or overriding clutch, one of the generators rotating in only one direction is driven only during wave induced upstrokes and the second, rotating in the opposite direction, is driven only during gravity induced down strokes of the float. Limiting gearbox-generator rotation to a single direction provides longer life and allows use of higher drive gear ratios for lower cost and/or allows the use of flywheel or spring energy storage of energy pulses (twice during each typical 6-16 second wave period) or the use of continuously variable speed transmissions for synchronous power production.

In summary, the present disclosure provides WEC cost (CAPEX) advantages plus improved wave energy capture efficiency, and severe sea survival advantages not available to WECs using Duck like floats with large central cylinders or other WEC types.

Most embodiments of Related U.S. Applications and Patents 2015/0082785 and U.S. Pat. No. 9,127,640, of which this application is a continuation-in-part, describe WECs using twin swing arms with EWFP floats which are submerged below wave troughs during severe sea conditions by any means including seawater flooding of the floats. Most embodiments also describe the use of a twin vertical spar frame with a drag plate at or near its bottom to reduce frame wave induced vertical motion (bobbing). While EWFP float submergence, by any means, during severe sea conditions is an effective WEC survival means, and twin spar frames with drag plates are effective for WECs with floating frames, the present disclosure is not limited to WECs with submergible floats or frames, or WECs with twin vertical spar frames. The present disclosure is also applicable to WECs using at least one EWFP float rotatably attached with at least 1 swing arm to shorelines, sea beds, docks or piers, off-shore platforms, pilings, offshore wind turbine towers, barges, boats, or other floating or fixed bodies or structures.

Most embodiments of the present disclosure describe EWFP floats and floating frames which are self-aligning parallel to predominant oncoming wave fronts using a weather vanning effect by having mooring lines attached to the frame pivotably connected to an up sea submerged or surface mooring ball piling, or tower, such that the lateral wave reaction forces acting on the WEC EWFP float(s) remain parallel to oncoming wave fronts. EWFP floats of the present disclosure can also be used in a fixed orientation facing the prevailing wave front direction.

BRIEF DESCRIPTION OF THE DRAWINGS

FIG. 6a is a side elevation view of the embodiment shown in FIG. 5 where the 2 lower vertical spar column legs are tubular, rather than truss structures, and can be partially or fully flooded with seawater ballast to alter the frame water line.

FIG. 6b is front elevation view of the embodiment shown in FIG. 6a.

FIG. 9a is a side elevation view according to still another embodiment of the disclosure utilizing a single vertical truss frame with 2 adjacent floats each connected to the frame and its PTO via a single swing arm.

FIG. 9b is a front elevation view of the embodiment shown in FIG. 9a.

DETAILED DESCRIPTION OF THE DISCLOSURE

Figure 1:
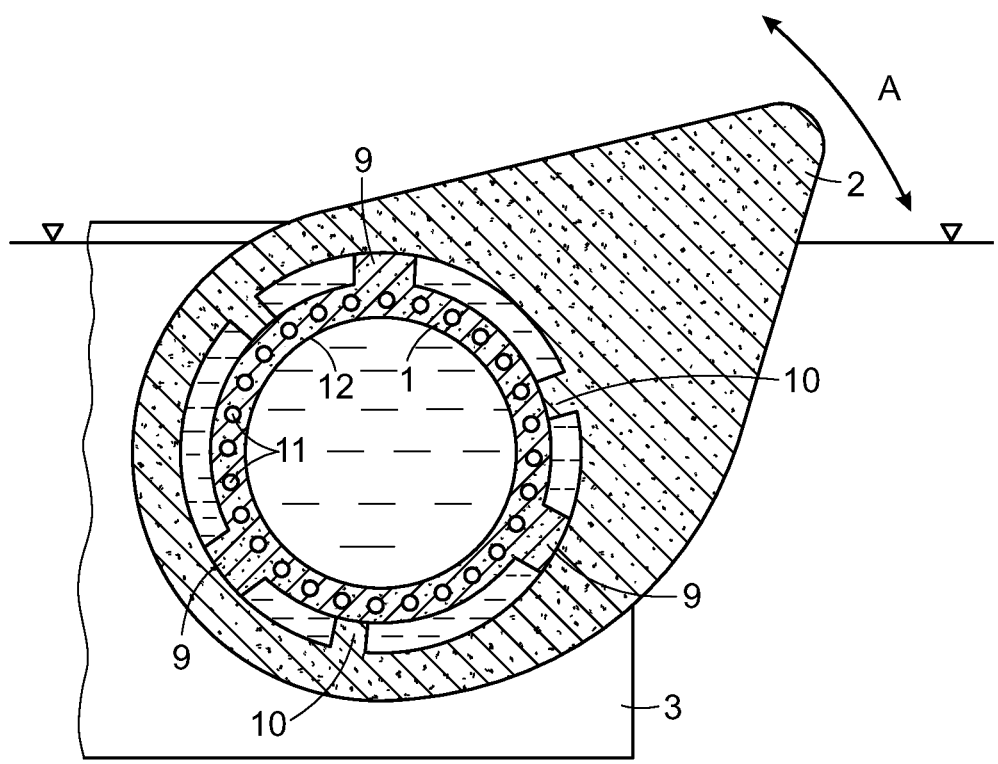
FIG. 1 is a side elevation sectional view of the Salter-"Edinburgh Duck" Related Art.
Figure 2:
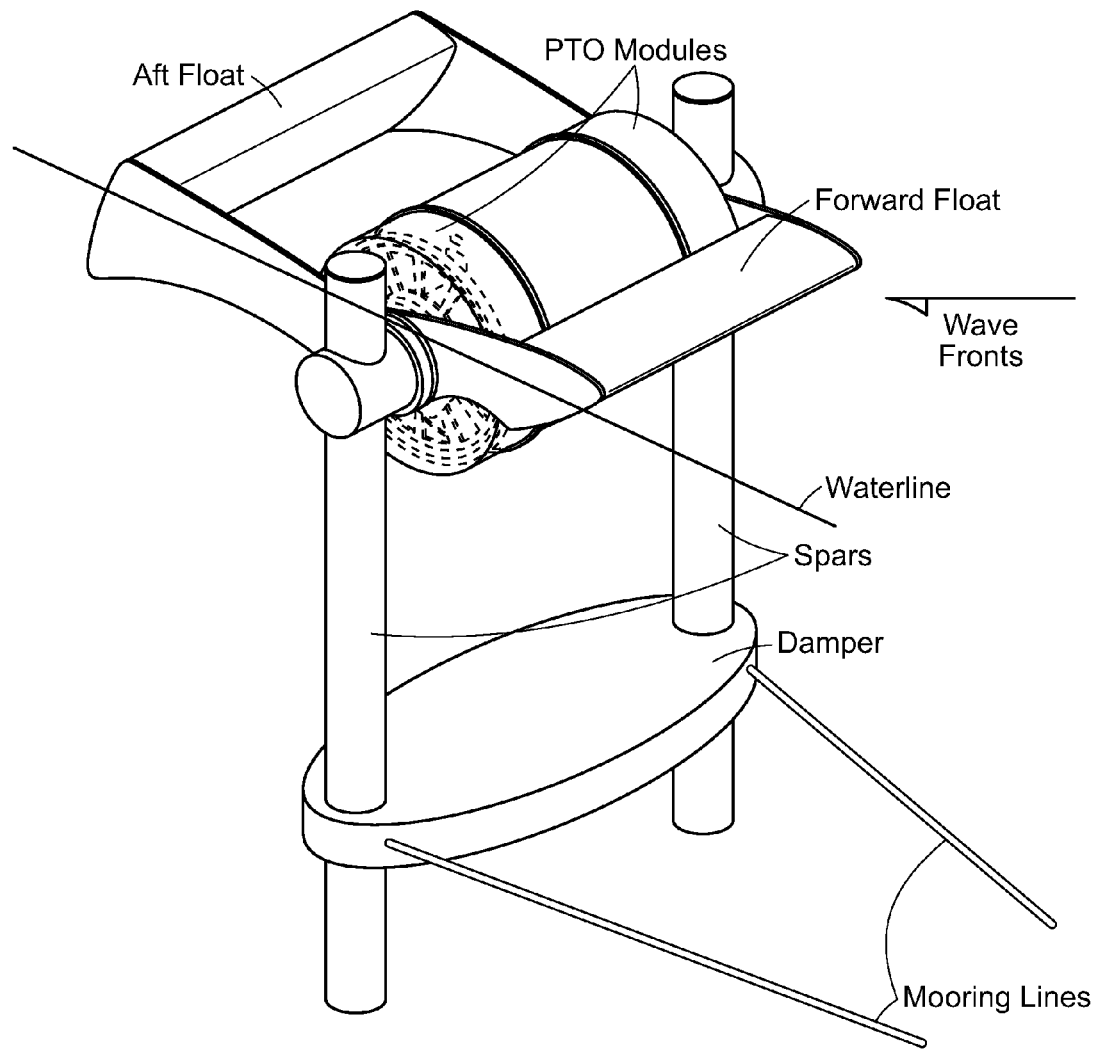
FIG. 2 is an isometric view of the Columbia StingRay Related Art.

FIG. 1 and FIG. 2 of the Salter Duck and the Columbia StingRay, respectively, are related prior art and are described in their references cited including GB1482085 (Salter) and US 2015/0252777 (Rhinefrank). They are also described and distinguished from the present disclosure in the BACKGROUND OF THE DISCLOSURE and SUMMARY OF THE DISCLOSURE sections above.

Figure 3:
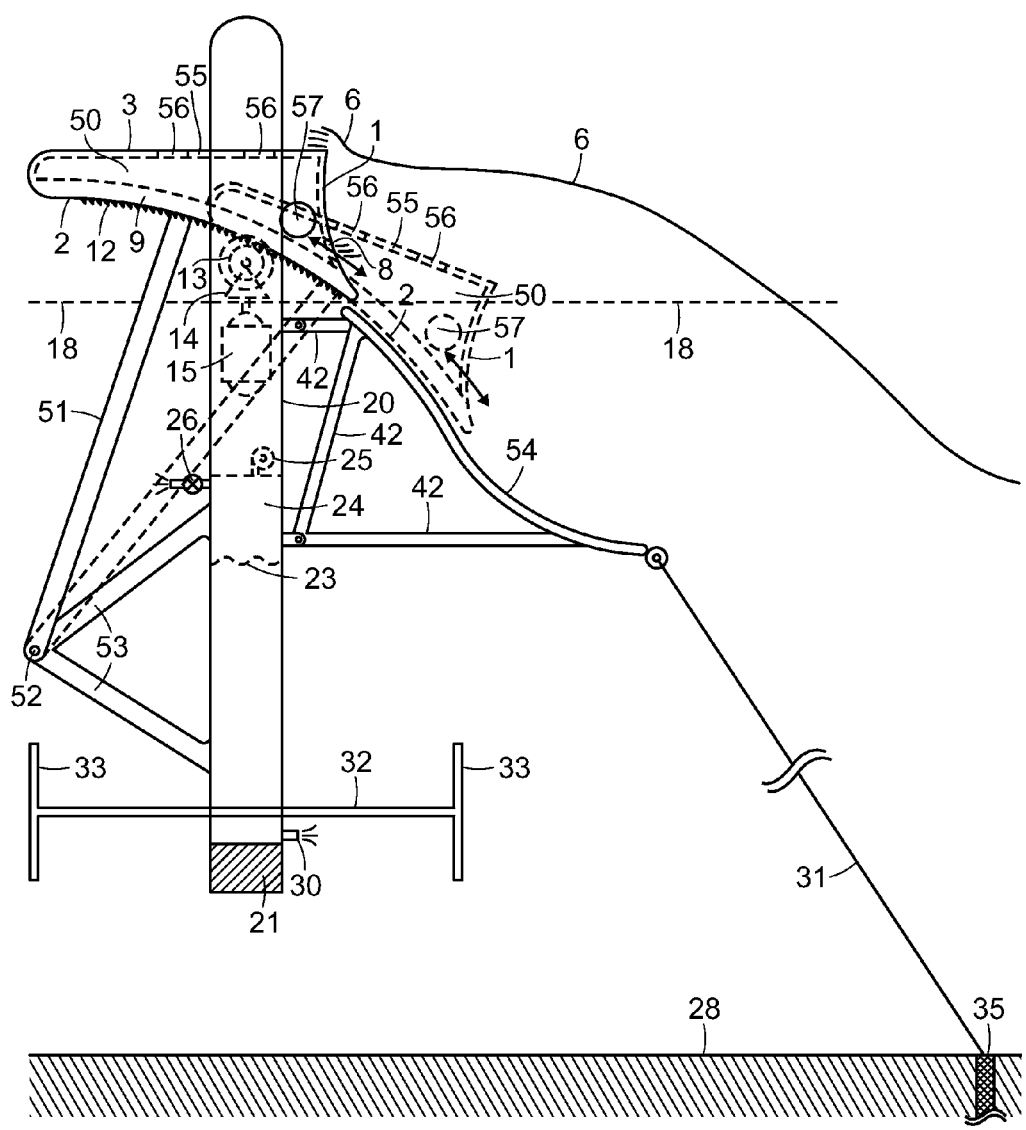
FIG. 3 is a side elevation of a wave energy capture device according to one embodiment of the disclosure having a float pivotably connected to a vertical spar frame by a swing arm with a fixed shoal plane attached to the frame rather than to the float.
Figure 4:
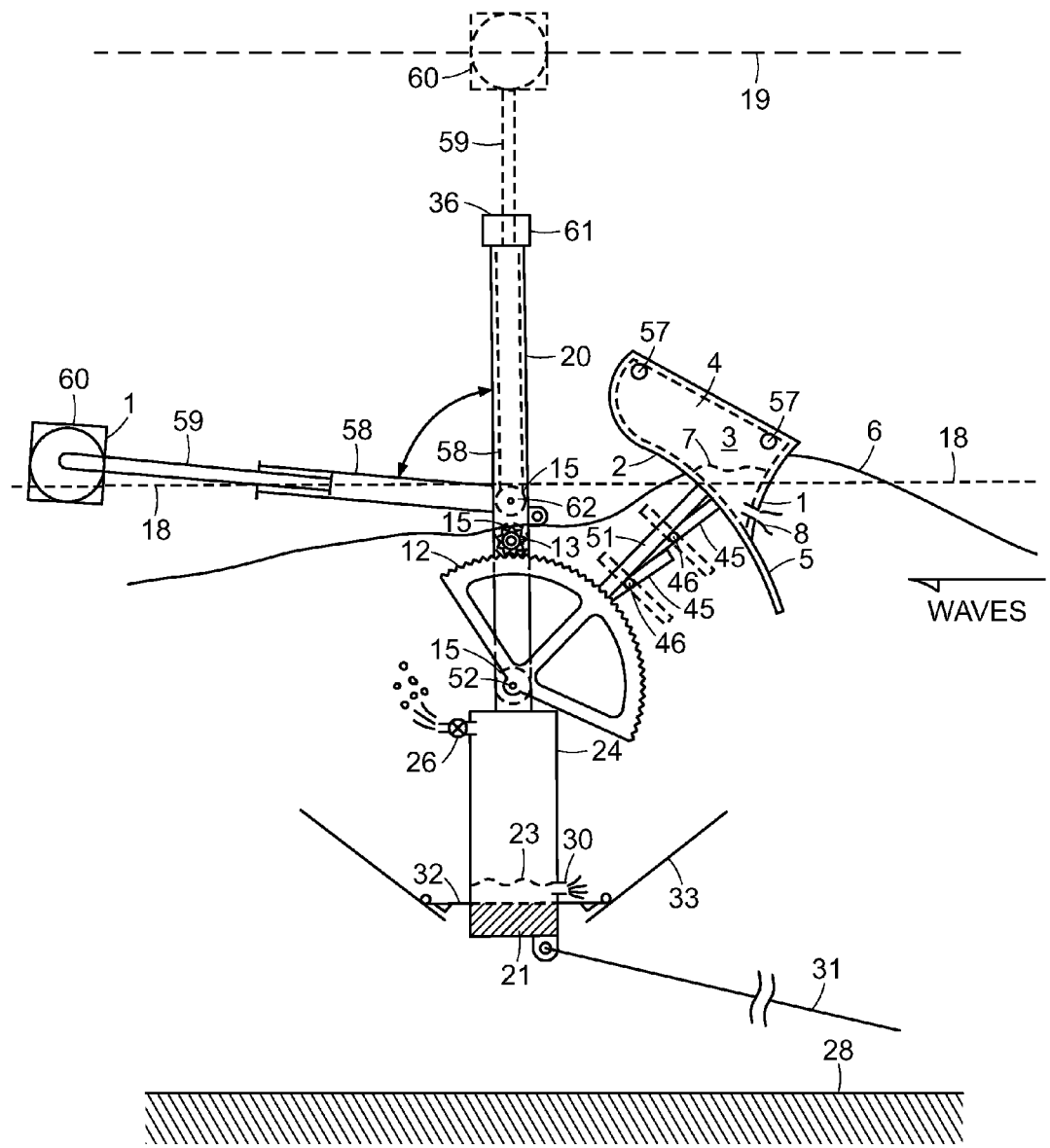
FIG. 4 is a side elevation of a wave energy capture device according to another embodiment of the disclosure that has a float with a partial arcuate rear wall and a short lower arcuate extension as well as a second rear float that can be active (driving a second generator) or locked in position to the frame to increase frame stability and buoyancy.

FIG. 3 and FIG. 4 are described in Rohrer U.S. Pat. No. 9,127,640 and Rohrer US 2015/0082785, respectively, both of which are incorporated herein by reference and both of which this application is a continuation-in-part. The element numbers used in FIG. 4 and FIG. 5 are consistent with those used to describe the present disclosure.

FIG. 3 describes a float 3 rotatably attached by swing arms 51 to a buoyant vertical spar frame 20 at pivot point or pivot axis 52. The generator 15 is housed within frame column 20 and driven by rack gear 12 on the float bottom through pinion gear 13 on the frame 20. The FIG. 3 embodiment uses a fixed shoaling plane 54 attached to the frame by struts 42 rather than shoaling lower lip extension attached to the float bottom of the present disclosure.

FIG. 4 also describes a fore float 3 with small lower extension 5 rotatably attached by swing arms 51 to a buoyant vertical spar frame 20 at pivot point or axis 52. The generator 15 is housed in either of 2 locations within frame column 20 and is driven either by swing arm 51 or by rack gear 12 mounted on swing arm 51. FIG. 4 lacks the large shoaling plane 54 of FIG. 3. FIG. 4 also has one or more aft located floats 60 connected to frame 20 by swing arm 58 plus 59 which arm can be rotated about pivot point 62 by wave motion to drive a second generator 15 or locked into a horizontal position for additional frame buoyancy and stability or locked in a vertical position when the WEC is in non-operating survival mode and the float 3 is flooded and rotated downward to the 6 o'clock position.

Figure 5:
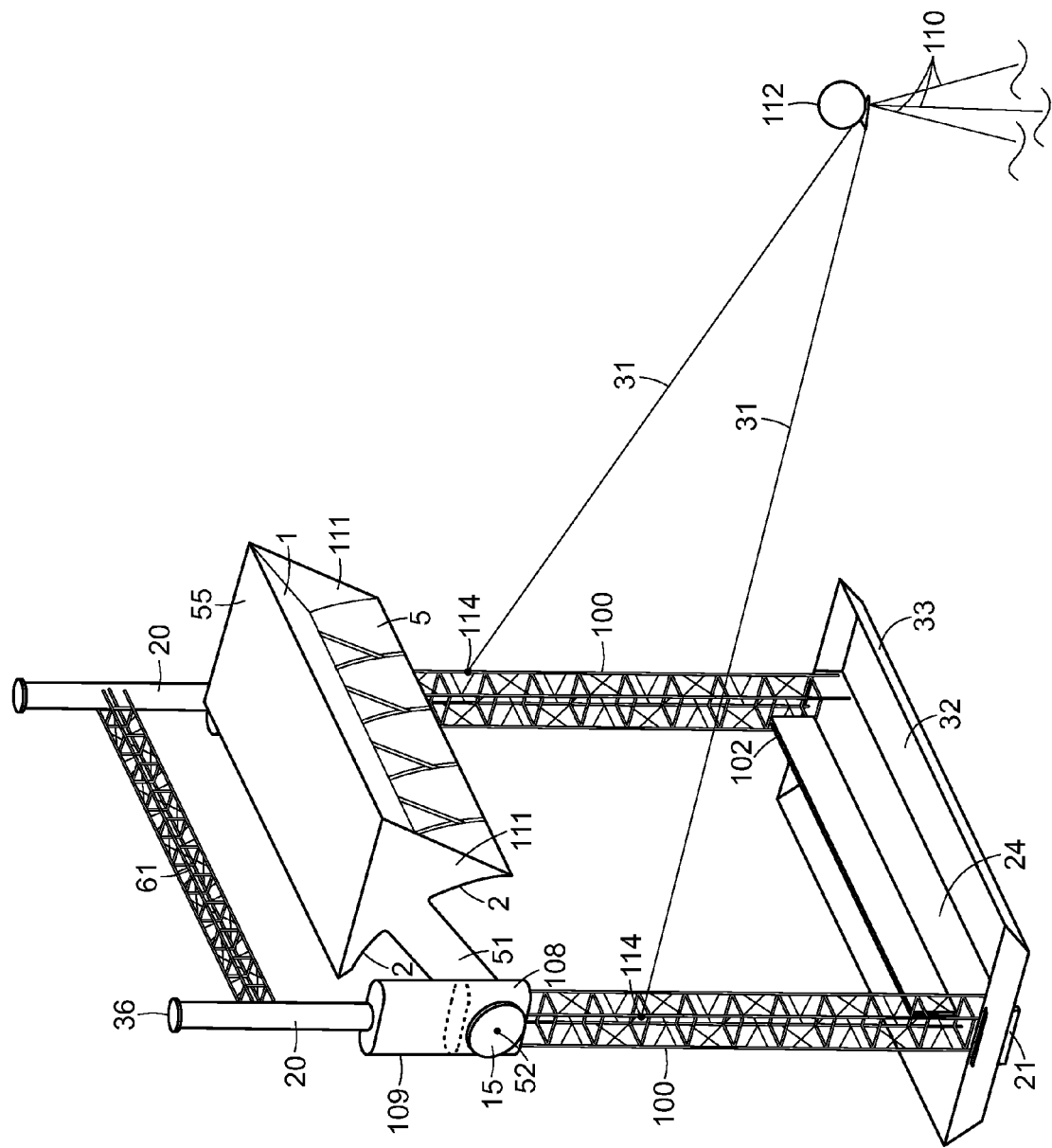
FIG. 5 is an isometric view of a wave energy capture device according to a further embodiment of the disclosure including mooring lines utilizing a frame comprised of 2 vertical spars where the port to starboard width of the float at full scale is 28 meters and which is designed to produce about 1.5 MW in 4 meter wave height seas.

FIG. 5 describes a full scale embodiment of the present disclosure having a EWFP float 3 with forward face 1, top deck 55, arcuate float back 2, and arcuate lower extension 5 of float back 2. The arc of float back 2 and its lower extension 5 are substantially concentric about pivot point or axis 52. The float also has side shields 111 preventing waves impacting the float forward face 1 from escaping laterally without the float 3 capturing its full kinetic (surge) wave energy. The Float is rotatably connected to the twin vertical spar frame (20, 109, 108, and 100 top to bottom) by 2 swing/drive arms 51 which rotate about pivot point or axis 52 driving a single PTO generator 15 housed in one spar or dual generators housed in both. Alternative Power Take-Off means (such as water or hydraulic pumps and motors) may also be utilized.

The twin vertical spar frame is comprised of an upper tubular section 20 with maintenance access hatch 36 which protrudes through upper floatation chamber 109 providing access to the PTO-generator housing 15 which is flanked or surrounded by the lower floatation chamber 108. A large horizontal surface area drag plate 32 is rigidly connected to the lower frame float chamber 108 and PTO housing by vertical pipe truss type spars 100 or tubular spars (not shown). The horizontal drag plate 32 has raised fore and aft edges 33 which can be angled upward (shown) or vertical (not shown except and at port and starboard ends) and extended to act as vertical drag plates replacing vertical drag plate 102. A triangular section cross beam 24 with vertical plane drag plate on top 102 increases the stiffness of drag plates 32 and 102 and also serves as an additional seawater floodable ballast tank to adjust frame buoyancy and its water line and/or to alter the distance between the frame's center of gravity (CG) and center of buoyancy (CB). One or more high density metal or reinforced concrete ballasts 21 are attached to the bottom of the drag plate 32. The twin vertical spar frame of FIG. 5 also shows an upper lateral cross truss 61 which in combination with the lower drag plate assembly provides additional frame torsional rigidity.

Altering the frame's CG to CB distance changes the pitch recovery time after the frame is pitched rearward by the heave (vertical) and surge (lateral) forces applied by each oncoming wave against the float 3 (acting through pivot point or axis 52) plus wave forces acting directly against the upper frame sections 108 and 109. It is desirable to have the upper frame pitching forward in pitch recovery from the prior wave for at least an initial portion of the time that wave forces from the subsequent wave are again lifting the float. This increases the relative rotation between the swing/drive arm(s) and the frame vertical axis housing the PTO. Some lag in frame pitch recovery is inevitable and unavoidable because the mass and natural frequency of the float will always be much smaller than the more massive frame including any water mass entrapped or blocked by the frame and drag from the frame structure.

The generator 15 (or alternative PTO) may be direct driven or driven through a step-up gearbox to increase generator RPM and reduce its cost several fold. Typical ocean wave periods and amplitudes produce only 1-4 direct drive RPM, about 1/10$^{th}$ the RPM of costly large diameter direct drive wind turbines using high efficiency permanent magnets.

If 2 generators are used, one in each spar, they can be redundant providing continued power generation until a broken generator or gearbox is repaired. Alternatively one generator in one spar can be used for energy capture during the float upstroke on wave crests and the other generator in the other spar used during down strokes into wave troughs by using a ratcheting, or one way over-riding clutch. This allows each generator (and gearbox if used) to continuously turn in only one direction reducing bearing and gear wear. A spring or flywheel with variable speed transmission can also be used between the drive axle and generator to smooth out energy input pulses and reduce generator RPM variation from typical ocean 6-16 second wave periods.

FIGS. 6a and 6b show a side and front elevation, respectively, of an embodiment of the present disclosure. The embodiment also utilizes a twin vertical spar frame and is similar to the embodiment described for FIG. 5. This lower spar frame legs 100 of this embodiment are of tubular construction rather than the pipe truss type spar lower legs of FIG. 5. The horizontal plane cross sectional area (water plane area) of the frame upper floatation chambers 109 at or near the frame water line level 18 are substantially smaller than the horizontal plane cross sectional area below the water line transecting the PTO generator housing with supplemental floatation chambers 108. The heaving (lifting) force applied to the frame by each passing wave crest produces vertical frame translation which reduces the relative motion between swing arm and frame and hence wave energy absorption. Reducing the frame water plane area reduces frame heave force proportionally thus reducing the horizontal drag plate 32 area required to maintain vertical frame motion stability.

FIGS. 6a & 6b also show hinged vertical drag plates 113 attached to the frame upper float chambers 109 with the hinges 114 arranged on the rearward (aft) vertical sides of plates 113. These hinged drag plates remain flat (per FIG. 6a) with the upper float chamber housing as passing lateral wave crest forces acting on both the float and upper frame pitch the upper frame rearwards. The hinged drag plates swing and are mechanically stopped in an open position, however, (113 in FIG. 6b) on subsequent wave troughs delaying frame pitch return which increases the relative rotational motion between frame and float and hence wave energy captured as previously described.

FIG. 6a also describes a mooring system of an embodiment of the present disclosure. A submerged buoyant mooring buoy 112 is connected to the seabed by 3 tensioned mooring cables 110. Two lateral (substantially horizontal) mooring lines converge at the mooring buoy 31 and are pivotably attached to the buoy 31 and also attached to each of the lower twin spar frame legs at attachment points 114. Because the mooring buoy 112 is up sea of wave forces being applied against the EWFP float 3 and the frame, the frame with attached EWFP float weather vanes into oncoming waves maintaining the EWFP float relatively parallel to oncoming wave fronts thus intercepting maximum wave front width and energy. It should also be noted that the location of attachment point 114 and the size depth and drag of mooring ball 112 will increase or decrease frame pitch rebound timing which will increase or decrease wave energy capture.

Unlike FIG. 5 the fore and aft ends of frame attached horizontal drag pate 32 are substantially vertical with a rounded corner at the intersection of vertical plates 33 and horizontal plate 32. This provides less drag when the frame is returning downward (after wave induced heave forces on the float) and more resistive forces when wave forces against the float attempt to lift the frame vertically upwards. The vertical surfaces of 33 supplemented by the vertical drag plate area of vertical plate 102, if required and used, are relatively deep in the water column where very little wave motion is present (wave motion and energy decreases exponentially with depth). The combined drag plates at this depth (32, 33, and 102) shift the frame center of pitching rotation near these plates rather than higher up on the lower frame legs. This longer radius about the center of frame pitch rotation delays frame pitch return while the float has already started its next up stroke on the oncoming subsequent wave crest which is desirable as this increases the relative rotational motion between float and frame thus wave energy capture.

Figure 7:
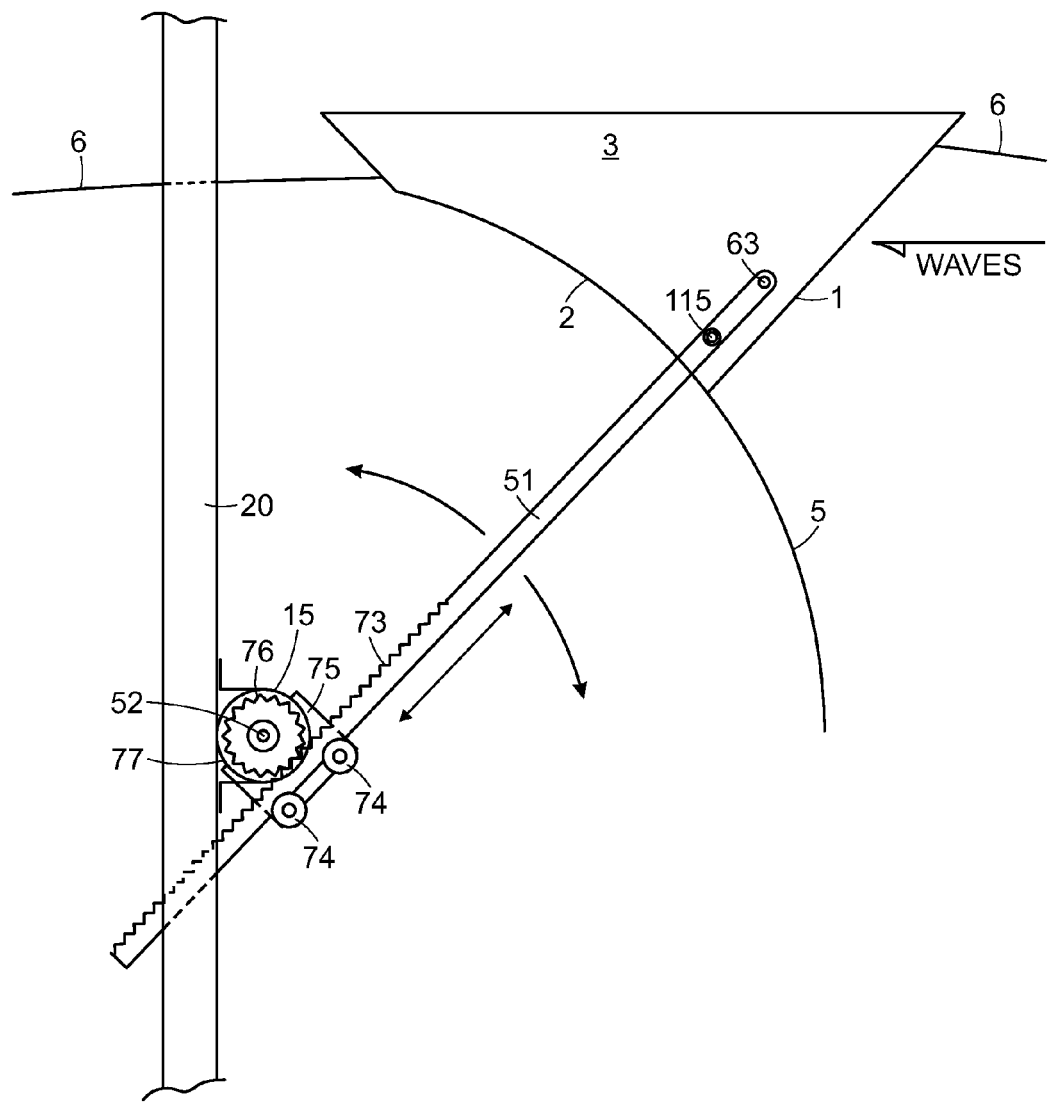
FIG. 7 is a side elevation of yet another embodiment of the disclosure with arcuate float back and lower extension and also using at least one compound swing arm of Rohrer US 2015/0082785 which swing concurrently both rotates and linearly translates to capture additional wave energy.

FIG. 7 describes an embodiment of the present disclosure using a float 3 with arcuate back 2 and arcuate lower extension 5 rotatably connected by swing arm 51 to a vertical frame 20 about pivot point or axis 52, swing arm 51 being rigidly connected to float 3 at points 115 and 63. In this embodiment, however, the length of swing arm 51 is not fixed and constant. Swing arm 51 length can be adjusted (by an electric drive) periodically or seasonally to maximize energy capture for average or anticipated wave period and amplitude (which can be forecasted several days in advance). Alternatively, as described in greater detail in Rohrer US 2015/0082785, swing arm 51 can translate increasing and decreasing its length during each wave cycle and driving a second PTO or generator 15 co-located at or near swing arm pivot point or axis 52. Salter and Lin (in Sloped IPS reference previously cited) confirmed that WEC floats which concurrently moved both horizontally (in response to wave surge forces) and vertically (in response to wave heave forces). When WEC floats are constrained to move at a 45° incline (there best case) maximum possible wave energy capture is equal to 0.7101 (the sine and cosine of 45°). If, however, the swing arm of the present disclosure rotates around a middle of 45° but also is free to translate, higher maximum efficiencies are possible.

Figure 8:
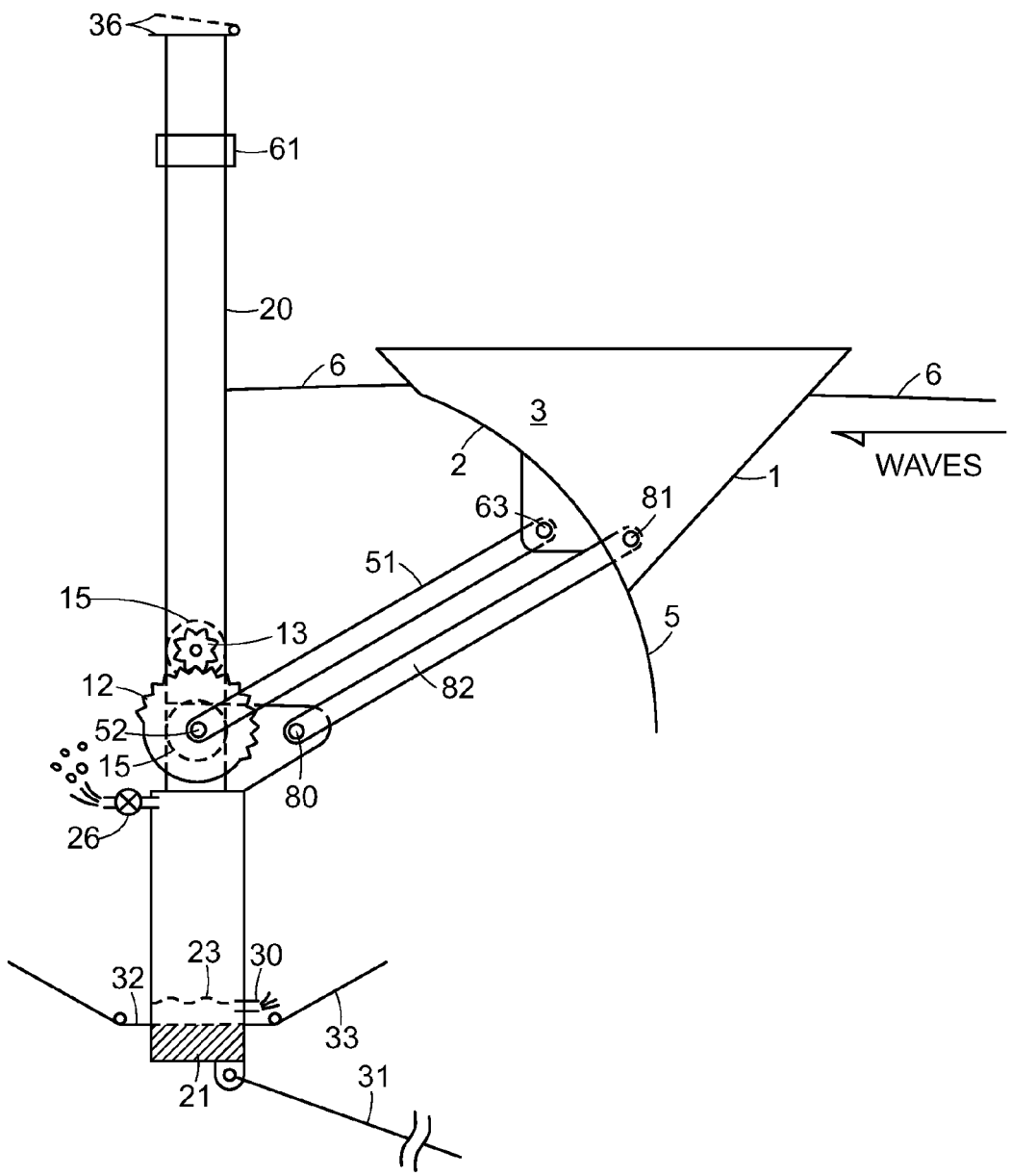
FIG. 8 is a side elevation view of a yet further embodiment of the disclosure with arcuate float back and lower extension and also utilizing at least one pair of dual swing arms, one positioned above the other, of Rohrer US 2015/0082785 which dual arms determine and control the orientation of the float front face.

FIG. 8 describes an embodiment of the present disclosure using a float 3 with arcuate back 2 and arcuate lower extension 5, rotatably connected by 2 swing arms 51 and 82 or port and starboard swing arm pairs, one 51 being located above the other 82, and both being pivotably connected to the frame at pivot points or axis 52 and 80 respectively, and both also being pivotably connected to the float 3 at pivot points or axis 63 and 81 respectively. Swing arm 51 drives a PTO or generator either directly at pivot point or axis 52 or indirectly through bull gear 12 to pinion gear 13 mounted to generator 15 located within or affixed to frame vertical spar column 20. Use of dual swing arms, or swing arm pairs (on port and starboard sides of float 3) one arm located above the other and of equal or unequal length, controls and determines the orientation of the float and its wave impacting forward face as it travels on its rotational path in response to wave forces (on the up stroke and gravity (on down stroke). Float 3 also has at least one aperture to controllably admit or discharge seawater from the float 3 to either increase or decrease its mass for maximizing energy capture in changing sea conditions or to substantially flood float 3 to low or even negative buoyancy to facilitate its rotation down to a secure storm survival position where the float's center of gravity is substantially below pivot point or axis 52 placing the float 3 safely below troughs of even large storm waves.

FIG. 9 describes an embodiment of the present disclosure utilizing two floats 3 with arcuate float backs 2 and arcuate float back extensions 5 both floats being rotatable connected by two swing arms 51 (port and starboard) each arm driving either a common PTO or generator on a common shaft 116 (common un-split shaft not shown) or separate PTOs or generators with shaft 116 being split between the generators 15 (as shown).

The buoyant frame of FIG. 9 is comprised of a single vertical spar having a tubular upper section 20 with upper hinged hatch 36 for accessing PTO and power conditioning equipment within the PTO housing 108 which lies below frame floatation chamber 109 shown with small amount of seawater ballast to raise or lower the frame water line to adjust device performance, energy capture or storm wave exposure. Lower vertical spar column 100 can be either tubular (not shown but like FIGS. 6, 7 & 8) or of pipe truss type as shown. At or near the bottom of vertical frame truss 100, like most other embodiments of the present disclosure, is located a horizontal drag plate 32 with fore and aft vertical ends, a seawater ballast tank 24 with a vertical drag plate above it 102. The lower frame section is connected to a single mooring bar 107 at pivoting point 106. The forward or for end of the bar 107 is connected through connection point 105 to a single lateral mooring line 31 which is connected to and pivots about mooring ball 112 (as shown in FIG. 5). Like most previous embodiments floats 3 can be partially filled with seawater at water level 7 as shown or fully flooded and rotated downward such that their center of gravity is substantially below pivot point or axis 52 and subsequently drained through controllable apertures 8.

What I claim as new and desire to secure with a United States Letters Patent is:

1. A wave energy converting device for converting the energy of waves into electrical power, pressurized fluid, or other useful or transportable energy comprising:
   at least one elongated float having a float body and a center of buoyancy, which, alone or in combination with adjacent floats, has a wave-front width greater than a front-to-back depth, excluding any float attachments, extensions, or appendages, and having a wave-impacting forward face oriented or self-orienting substantially parallel to oncoming wave fronts and having a substantially concave arcuate rear wall with a rear wall lower extension, affixed to, or integral with, the lower portion of the elongated float body, and extending substantially beyond and below the float body, the majority of the arcuate rear wall and lower extension having a radius of curvature approximating the arcuate wave-induced motion path of the elongated float rear wall about a float pivot point or float pivot axis and approximately concentric about the pivot point or pivot axis;
   a base comprising a fixed body, floating body or frame having at least one base pivot point or base pivot axis to which the at least one elongated float is movably connected by at least one swing arm, which base pivot point or base pivot axis is located substantially aft or down sea of the at least one elongated float's center of buoyancy and substantially below the still water line, wherein the at least one swing arm controls the orientation and path of a wave-induced relative motion between the at least one elongated float and the base;
   at least one base position restraining, fixing, anchoring, or stabilizing device integral with, or directly or indirectly connected to, the base to determine or maintain its movement, location or orientation, wherein the at least one base position restraining device is selected from the group consisting of mooring lines, submerged or surface mooring buoys, gravity weights, anchors, drag plates, drag planes, water, solid ballasts, floats, vessels, seabed, shorelines, breakwaters, seawalls, docks, piers, platforms, pilings, seabed-affixed or floating towers, and combinations thereof; and,
   at least one power take-off (PTO) apparatus secured to or within the base and configured to be driven by at least one force generated by the wave-induced relative notion between the at least one elongated float and the base through the at least one swing arm.

2. The device of claim 1 wherein the elongated float arcuate rear wall lower extension extends along the float rear wall substantially below the float body.

3. The device of claim 1 wherein the arcuate rear wall combined with any lower rear wall extension spans an angle about the swing arm pivot point or axis of at least about 30°.

4. The device of claim 1 wherein the arcuate real wall combined with any lower rear wall extension spans an angle about the swing arm pivot point or axis of up to about 180°.

5. The device of claim 1 wherein the at least one elongated float is fully submerged with its center of gravity substantially below the pivot point or axis during severe sea states and subsequently raised to the sea surface to resume power generation with calmer sea conditions.

6. The device of claim 5 wherein the at least one elongated float comprises one or more interior cavities, wherein the at least one elongated float is fully submerged with its center of gravity substantially below the pivot point or pivot axis by at least partially flooding one or more of the interior cavities with seawater through controllable apertures and subsequently raising the elongated float to the sea surface where seawater is drained through the controllable apertures before resuming power generation.

7. The device of claim 1 further comprising controllable apertures for permitting the ingress and egress of liquids into the at least one elongated float, wherein the at least one float's mass is increased or decreased by the controlled admission or drainage of seawater through the controllable apertures.

8. The device of claim 1 wherein the float has port and starboard sides, wherein the port and starboard sides are extended forward from the elongated float forward face or rear wall lower extension to reduce water mass waves approaching the port or starboard sides of the forward face from escaping impact with the forward face.

9. The device of claim 1 wherein the base is a partially submerged buoyant frame comprised of at least one vertical spar and having a center of gravity and a center of buoyancy, wherein the center of gravity is substantially below the center of buoyancy, wherein the at least one spar has at least one substantially horizontal drag plate or plane rigidly attached at or near the bottom of the at least one spar.

10. The device of claim 9 further comprising at least one substantially vertical plate attached to the fore, aft or middle section of the horizontal drag plate, wherein the vertical plate is substantially parallel to the at least one elongated float.

11. The device of claim 1 wherein the frame further comprises chambers or cavities, internal to the frame or affixed to the frame, wherein the buoyancy and the elevation of the base relative to a still water line and its base pivot point or base pivot axis can be increased or decreased by the admission or discharge of seawater from the chambers or cavities of the frame.

12. The device of claim 1 wherein the base has a water plane area, wherein the water plane area of the base at the still water line is substantially less than the water plane area below the still water line.

13. The device of claim 1 wherein the return or rebound from a first wave, following wave-induced lateral motion, of the base pivot point or base pivot axis of the base is substantially delayed beyond the time when the at least one elongated float reaches a subsequent second wave trough by devices selected from the group consisting of mooring buoy drag forces, mooring line-to-frame attachment location, float center-of-buoyancy and center-of-gravity location, the size, location and orientation of hinged or fixed vertical drag plates secured to the base, and combinations thereof.

14. The device of claim 1 wherein the length of the at least one swing arm can be increased or decreased to increase wave energy capture during differing sea state average wave periods and amplitudes.

15. The device of claim 1 wherein the length of the at least one swing arm is increased and decreased during each wave cycle to recover additional wave energy using a second PTO or the at least one PTO.

16. The device of claim 1 wherein the at least one elongated float can swing on the at least one swing arm through a full 360° of rotation about the float pivot point or float pivot axis without float or swing arm mechanical interference with the base.

17. The device of claim 1 further comprising at least one second elongated float and at least one second elongated float pivot point or second float pivot axis, wherein the base contains a second base pivot point or second base pivot axis connected to the at least one second elongated float located substantially aft of the at least one elongated float by at least one second swing arm which controls the orientation and path of wave-induced relative motion between the at least one second elongated float and the base, the at least one second elongated float pivot point or at least one second elongated float pivot axis being located above, below or on the first float pivot point or pivot axis, wherein the at least one second swing arm either drives a second PTO, or is locked into a stationary position relative to the base.

18. The device of claim 1 wherein the at least one swing arm is comprised of two swing arms or swing arm pairs, one substantially above the other and of equal or unequal length, both pivotably connected to the at least one elongated float and the base at two distinct swing arm pivot points or pivot axes such that the orientation of the at least one elongated float; and wherein wave impacting forward face of the at least one elongated float is controlled throughout the at least one elongated float's wave-induced rotation about the swing arm pivot points or pivot axes.

* * * * *